(12) United States Patent
Fujikawa

(10) Patent No.: US 10,636,374 B2
(45) Date of Patent: Apr. 28, 2020

(54) ELECTROOPTIC DEVICE AND ELECTRONIC APPARATUS

(71) Applicant: SEIKO EPSON CORPORATION, Tokyo (JP)

(72) Inventor: Shinsuke Fujikawa, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/220,705

(22) Filed: Dec. 14, 2018

(65) Prior Publication Data

US 2019/0139505 A1 May 9, 2019

Related U.S. Application Data

(62) Division of application No. 15/370,995, filed on Dec. 6, 2016, now Pat. No. 10,192,503.

(30) Foreign Application Priority Data

Dec. 28, 2015 (JP) ................. 2015-256089

(51) Int. Cl.
*G09G 3/36* (2006.01)
*G02F 1/1368* (2006.01)
*G02F 1/1362* (2006.01)
*G02F 1/1345* (2006.01)

(52) U.S. Cl.
CPC ......... *G09G 3/3648* (2013.01); *G02F 1/1368* (2013.01); *G02F 1/13454* (2013.01); *G02F 1/136286* (2013.01); *G09G 3/3611* (2013.01); *G09G 3/3677* (2013.01); *G09G 3/3688* (2013.01); *G09G 2300/0426* (2013.01); *G09G 2300/0814* (2013.01); *G09G 2330/021* (2013.01); *G09G 2330/045* (2013.01)

(58) Field of Classification Search
None
See application file for complete search history.

(56) References Cited

U.S. PATENT DOCUMENTS

| 6,100,947 | A | 8/2000 | Katayama |
| 2006/0262130 | A1 | 11/2006 | Kim et al. |
| 2015/0170564 | A1 | 6/2015 | Kwon |
| 2017/0176793 | A1* | 6/2017 | Choi ................ H01L 29/41733 |

FOREIGN PATENT DOCUMENTS

| JP | 2006-258857 A | 9/2006 |
| JP | 2007-240830 A | 9/2007 |

OTHER PUBLICATIONS

Mar. 7, 2018 Office Action issued in U.S. Appl. No. 15/370,995.
Jun. 18, 2018 Office Action issued in U.S. Appl. No. 15/370,995.
Oct. 3, 2018 Notice of Allowance issued in U.S. Appl. No. 15/370,995.

* cited by examiner

*Primary Examiner* — Sepehr Azari
(74) *Attorney, Agent, or Firm* — Oliff PLC

(57) ABSTRACT

An electrooptic device includes a scan line; data lines; a scan line driving circuit that selects the scan line; a data line driving circuit that supplies data signals to the data lines; a TFT that includes a gate electrode receiving gate signals for selecting the data line and has one end connected to the data line and the other end connected to the data line driving circuit; and a TFT that includes a gate electrode receiving gate signals for selecting the data line and has one end connected to the data line and the other end connected to the data line driving circuit. The gate electrode of the TFT overlaps the data line.

15 Claims, 10 Drawing Sheets

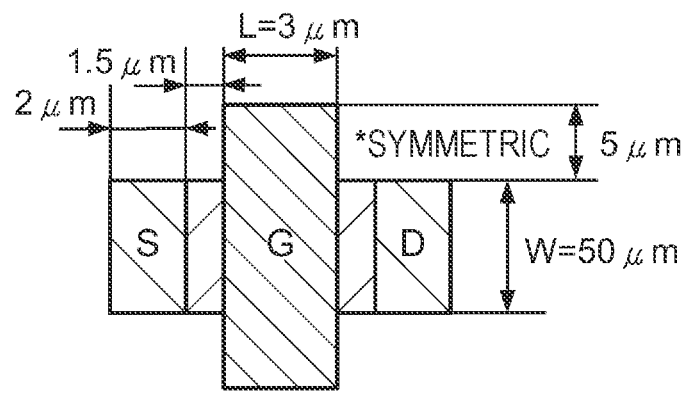
FIG. 9A
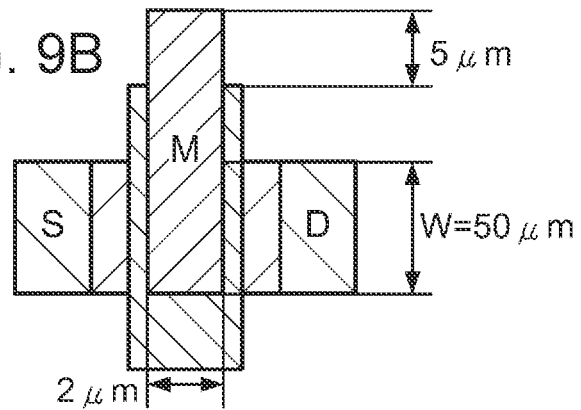
FIG. 9B
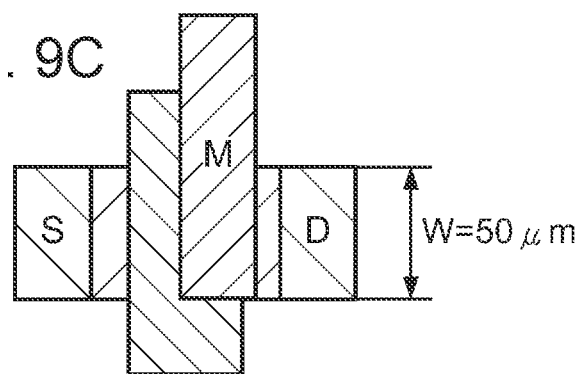
FIG. 9C
FIG. 9D
|   | A | B | C |
|---|---|---|---|
| ALL | 14fF | 30fF | 26fF |
| S | 7.0fF | 6.6fF | 6.8fF |
| D | 7.1fF | 6.7fF | 5.8fF |
| M | — | 16fF | 13fF | ial
ELECTROOPTIC DEVICE AND ELECTRONIC APPARATUS

CROSS REFERENCE TO RELATED APPLICATION

This application is a division of U.S. application Ser. No. 15/370,995, filed Dec. 6, 2016, the contents of which are incorporated herein by reference.

BACKGROUND

1. Technical Field

The present invention relates to an electrooptic device and an electronic apparatus, particularly to a technique for reducing push down voltage in an electrooptic device.

2. Related Art

JP-A-2007-240830 describes an electrooptic device with a hybrid drive system in which an X driver performs time-division supply of data signals to a plurality of data lines. The hybrid drive system includes a demultiplexer that selects a data line from among the plurality of data lines one by one in a time shared manner for data supply. JP-A-11-52429 describes a transistor with a metal layer that is disposed on a region over a gate electrode of the transistor and that can be fixed at a certain potential.

The size of thin film transistors (TFTs) in electrooptic devices such as liquid crystal devices, which are used to select data lines for supplying data signals, is being increased in order to achieve high-speed driving of display panels. Meanwhile, pitch reduction of TFTs in electrooptic devices has been making progress and thus the TFTs have higher parasitic capacitance. Therefore, when N-type TFTs are used due to the limitation of the layout and the like, the push down voltage due to the TFTs increases, causing high power-consumption by the drive IC for driving data lines. This high power-consumption exacerbates the problem of heat generation.

SUMMARY

An advantage of some aspects of the invention is that a reduction in push down voltage due to parasitic capacitance in transistors used to select data lines is achieved.

An electrooptic device according to an aspect of the invention to achieve the advantage includes: a scan line; a first data line and a second data line that intersect the scan line; a scan line driving circuit that selects the scan line; a data line driving circuit that supplies data signals to the first data line or the second data line during a period where the scan line is selected; a first transistor that includes a gate electrode receiving gate signals for selecting the first data line, the first transistor having one end connected to the first data line and the other end connected to the data line driving circuit; and a second transistor that includes a gate electrode receiving gate signals for selecting the second data line, the second transistor having one end connected to the second data line and the other end connected to the data line driving circuit. The gate electrode of the second transistor overlaps the first data line.

In this case, the gate electrode of the second transistor receiving the gate signals for selecting the second data line overlaps the first data line and not the second data line. The presence of the first data line prevents the capacitance coupling between the gate electrode of the second transistor and the second data line. This reduces the push down voltage due to the parasitic capacitance in the second transistor.

According to the aspect, the first transistor may include a plurality of first sub-transistors, and the second transistor may include a plurality of second sub-transistors.

In this case, the first transistor and the second transistor each include a plurality of sub-transistors. This reduces push down voltage even when a narrow-pitch layout is employed for the electrooptic device.

According to the aspect, an overlap between a gate electrode of the first sub-transistor and the second data line and an overlap between a gate electrode of the second sub-transistor and the first data line may alternate in a direction in which the first data line and the second data line extend.

In this case, the spaces for the first data line, the second data line, and the gate electrodes of the first transistor and the second transistor can be reduced and the push down voltage can also be reduced.

According to the aspect, the electrooptic device may further include pixels at an intersection of the first data line and the scan line and an intersection of the second data line and the scan line. At least one of the first data line and the second data line may extend from the position of one of the sub-transistors connected to the first data line and the second data line, toward a direction away from the corresponding pixel, the one of the sub-transistors being farthest from the corresponding pixel.

In this case, unevenness of the parasitic capacitance due to the first data line and the second data line can be restrained.

According to the aspect, a central line of the first data line along the direction in which the first data line extends may deviate, toward the one end of the second transistor, from a central line of the gate electrode of the second transistor along a channel length direction.

In this case, a positional relationship between the gate electrode of the second transistor and the first data line overlapping each other reduces the parasitic capacitance in the second transistor.

According to the aspect, the electrooptic device may further include a data line selecting circuit that switches on the first transistor and switches off the second transistor to select the first data line, and that switches off the first transistor and switches on the second transistor to select the second data line. The data line driving circuit may supply the data signals via a signal line connected to the other end of the first transistor and the other end of the second transistor.

In this case, the electrooptic device with a so-called hybrid drive system has lower push down voltage due to the parasitic capacitance in a transistor for selecting a data line.

It should be noted that an embodiment of the invention can be regarded as an electrooptic device or an electronic apparatus.

BRIEF DESCRIPTION OF THE DRAWINGS

The invention will be described with reference to the accompanying drawings, wherein like numbers reference like elements.

FIGS. 9A to 9D show a result of calculations of parasitic capacitance in Configuration examples 1, 2, and 3 of the embodiment.

DESCRIPTION OF EXEMPLARY EMBODIMENTS

Embodiments of the invention will now be described with reference to the drawings.

Figure 1:
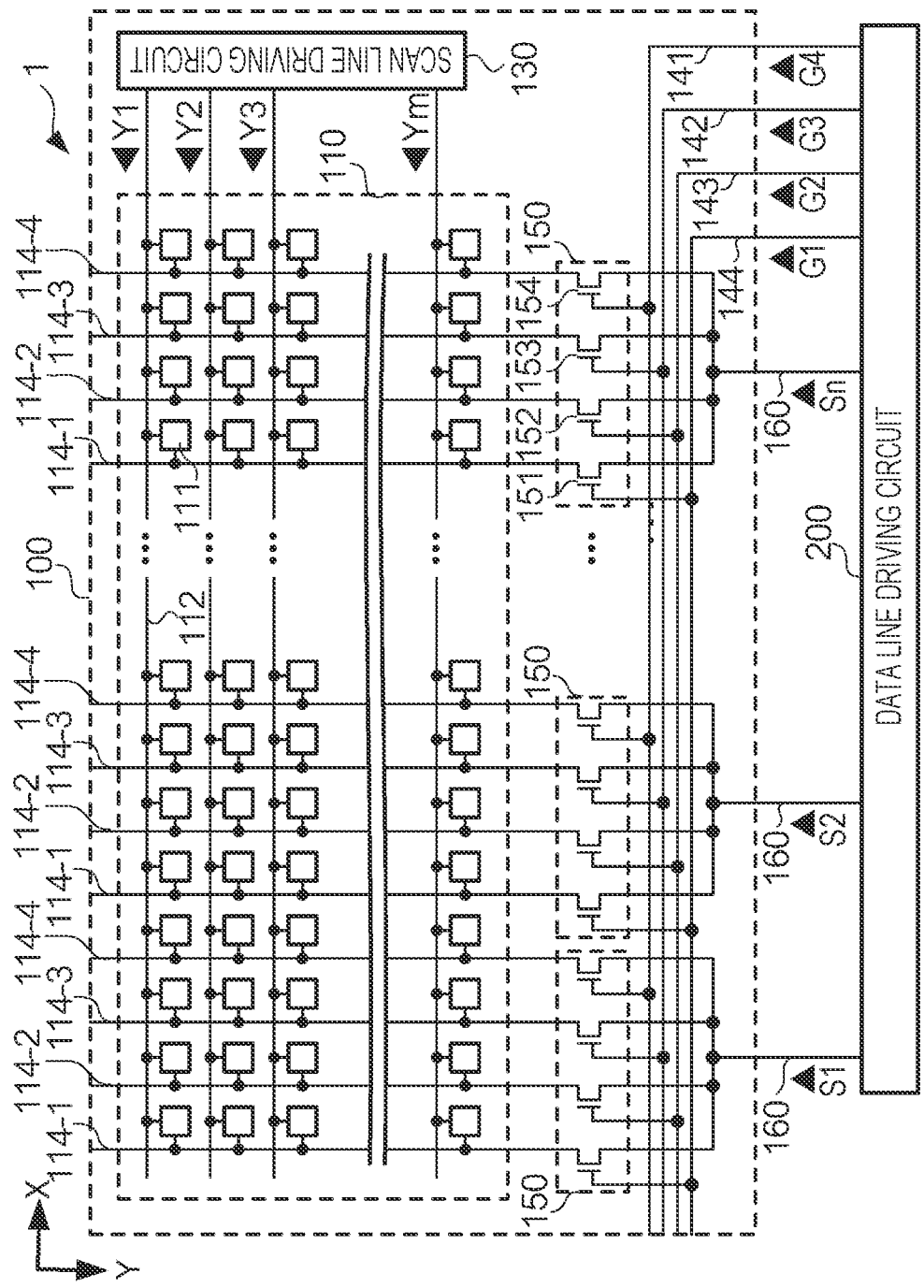
FIG. 1 illustrates the configuration of an electrooptic device according to an embodiment of the invention.

FIG. 1 illustrates the configuration of an electrooptic device 1. As shown in FIG. 1, the electrooptic device 1 includes a liquid crystal panel 100 and a data line driving circuit 200. The liquid crystal panel 100 includes a device substrate and a counter substrate bonded to each other with a certain gap therebetween such that their electrode-formed surfaces face each other. The gap is filled with, for example, twisted nematic (TN) liquid crystal. The data line driving circuit 200, which is a semiconductor chip, is mounted on the device substrate of the liquid crystal panel 100 by using chip on glass (COG) technology, chip on film (COF) technology, or the like.

The liquid crystal panel 100 includes a pixel area 110, a scan line driving circuit 130, a plurality of data line selecting circuits 150, a plurality of source signal lines 160, and gate signal lines 141, 142, 143, and 144.

The pixel area 110 is an area in which an image is displayed. The pixel area 110 includes m scan lines 112, (k×n) data lines 114-1, 114-2, 114-3, and 114-4 (which are collectively referred to as "data lines 114" when they should not necessarily be distinguished from each other), and (m×k×n) pixels 111. m, k, and n are natural numbers. The scan lines 112, which are signal lines for transmitting scan signals, are arranged in one or more lines in a first direction, i.e., row (X) direction. The data lines 114, which are signal lines for transmitting data signals, are arranged in one or more lines in a second direction, i.e., column (Y) direction. The scan lines 112 and the data lines 114 are electrically insulated from each other. The pixels 111 are present at the intersections of the scan lines 112 and the data lines 114 in the top view of the device substrate of the liquid crystal panel 100. In other words, the pixels 111 are arranged in a matrix of m rows×(k×n) columns. A series of k pixels 111 arranged in the X direction corresponds to one pixel group. In this embodiment, k is 4. Accordingly, the liquid crystal panel 100 has pixel groups of m row by n column matrix. The details of the pixels 111 will be described later. Hereinafter, a plurality of scan lines 112 is referred to as scan lines 112 in the first row, the second row, the third row, . . . , and the m-th row when they need to be distinguished from each other.

The scan line driving circuit 130 outputs scan signals for selecting one scan line 112 from the plurality of scan lines 112. The scan line driving circuit 130 supplies scan signals Y1, Y2, Y3, . . . , and Ym to the scan lines 112 in the first row, the second row, the third row, . . . , and the m-th row. The scan signals Y1, Y2, Y3, . . . , and Ym sequentially become a high (H) level in an exclusive manner.

The gate signal lines (control signal lines) 141, 142, 143, and 144 are signal lines for transmitting gate signals (control signals) G1, G2, G3, and G4 supplied from the data line driving circuit 200. The gate signals G1, G2, G3, and G4 sequentially become the H level in an exclusive manner.

The data line selecting circuit 150 selects one data line 114 from k data lines 114 in each pixel group. The data line selecting circuit 150, which is provided for each pixel group of n columns, includes TFTs 151, 152, 153, and 154. The TFTs 151, 152, 153, and 154 are n-channel field-effect transistors. The TFTs 151, 152, 153, and 154 are switching devices that select a data line 114 and include gate electrodes for receiving gate signals G1, G2, G3, and G4 for selection of the data line 114. In the TFTs 151, 152, 153, and 154, one electrode, which is a drain electrode, is connected to one data line 114, and the other electrode, which is a source electrode, is connected to the data line driving circuit 200 via the source signal line 160. The TFTs 151, 152, 153, and 154 select one data line 114 from the k data lines 114 connected to the corresponding pixel group, according to the gate signals G1, G2, G3, and G4. To be specific, upon reception of an L-level gate signal at the gate electrodes, the TFTs 151, 152, 153, and 154 are switched off, thereby breaking connection between the data lines 114 and the data line driving circuit 200. Meanwhile, upon reception of an H-level gate signal at the gate electrodes, the TFTs 151, 152, 153, and 154 are switched on, thus establishing connection between the data lines 114 and the data line driving circuit 200.

The source signal line 160 is a signal line for transmitting data signals (source signals) S, input from the data line driving circuit 200, to the data line selecting circuit 150. Data signals S are data to be written to the pixels 111.

The data line driving circuit 200 supplies data signals to data lines 114 while scan lines 112 are selected. In particular, the data line driving circuit 200 outputs data signals S1, S2, S3, . . . , and Sn to the respective source signal lines 160 for the first column, the second column, the third column, . . . , and the n-th column. The data line driving circuit 200 also outputs gate signals G1, G2, G3, and G4 to the gate signal lines 141, 142, 143, and 144, respectively.

Figure 2:
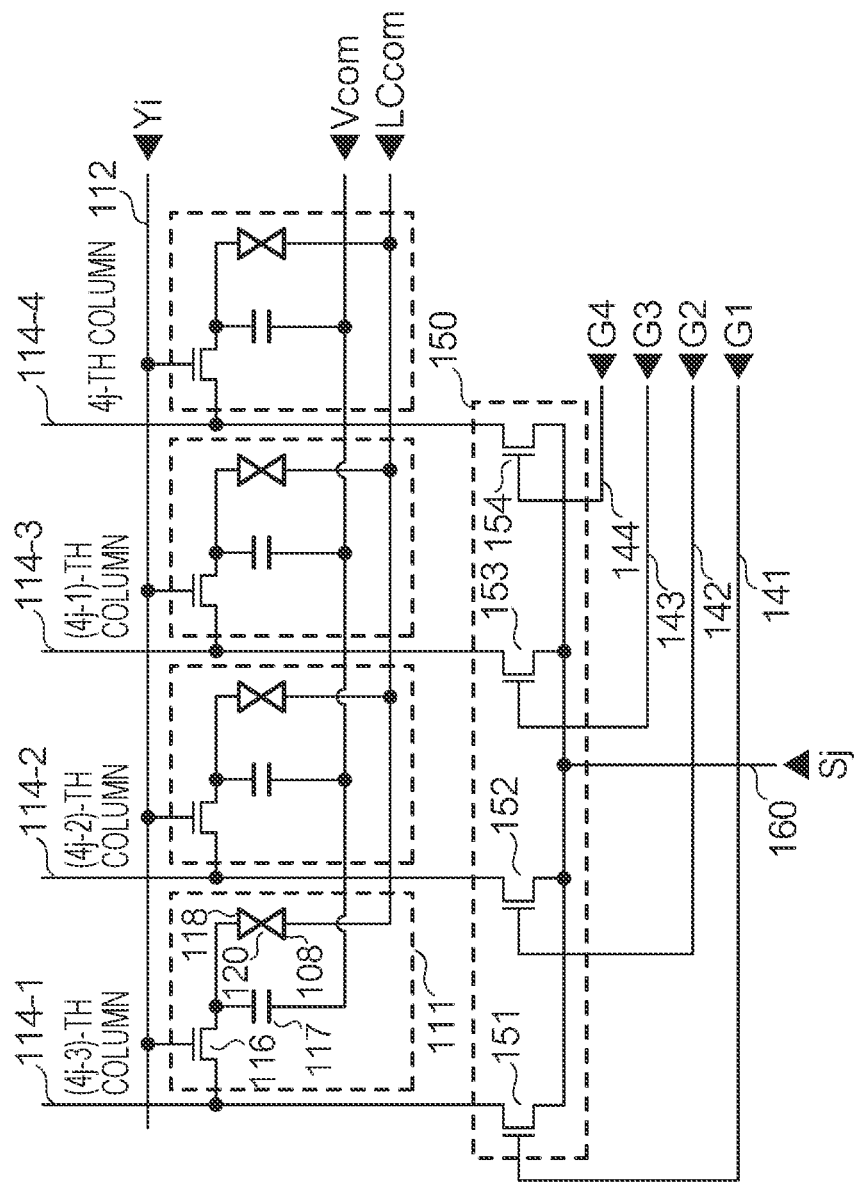
FIG. 2 illustrates equivalent circuits of pixels according to the embodiment.

FIG. 2 illustrates equivalent circuits of pixels 111. FIG. 2 shows the pixel group in the i-th row and the j-th column and the TFTs 151, 152, 153, and 154 in this pixel group (i and j are integers satisfying (1≤i≤m) and (1≤j≤n), respectively). A pixel group consists of pixels 111 across k columns (in this example, k=4). Each pixel 111 includes a pixel TFT 116, a pixel electrode 118, a liquid crystal layer 120, a common electrode 108, and a holding capacitor 117. The pixel TFT 116 is a switching device controlling data writing (voltage application) to the pixel electrode 118, and is a n-channel field-effect transistor here. For each pixel TFT 116, the gate electrode is connected to the scan line 112, the source electrode to the data line 114, and the drain electrode to the pixel electrode 118. Upon input of an H-level scan signal to the scan line 112, the pixel TFT 116 is switched on, which establishes continuity between the data line 114 and the pixel electrode 118. In other words, data is written to the pixel electrode 118. Upon input of an L-level scan signal to the scan line 112, the pixel TFT 116 is switched off, which breaks continuity between the data line 114 and the pixel electrode 118. The common electrode 108 is common to all the pixels 111. The common electrode 108 is, for example, at the common voltage LCcom applied by the data line driving circuit 200. The liquid crystal layer 120 is at a voltage corresponding to a difference between the potentials of the pixel electrode 118 and the common electrode 108. This voltage changes the optical characteristic (reflectance or transmittance). The holding capacitor 117 is parallel-connected to the liquid crystal layer 120 and holds a charge corresponding to a difference between the potentials of the pixel electrode 118 and the common voltage Vcom (here, Vcom equals LCcom).

For the TFT 151, the gate electrode is connected to the gate signal line 141, the source electrode to the source signal line 160 in the j-th column, and the drain electrode to the data line 114 in the (4j−3)-th column (i.e., the source electrode of the pixel TFT 116 in the pixel group in the j-th column). Upon input of an H-level gate signal G1 to the gate signal line 141, the TFT 151 is switched on, which establishes continuity between the source signal line 160 in the j-th column and the data line 114 in the (4j−3)-th column. In other words, the data signal Sj is supplied to the data line 114 in the (4j−3)-th column. Upon input of an L-level gate signal G1 to the gate signal line 141, the TFT 151 is switched off, which breaks continuity between the source signal line 160 in the j-th column and the data line 114 in the (4j−3)-th column.

For the TFT 152, the gate electrode is connected to the gate signal line 142, the source electrode is connected to the source signal line 160 in the j-th column, and the drain electrode is connected to the data line 114 in the (4j−2)-th column. Upon input of an H-level gate signal G2 to the gate signal line 142, the TFT 152 is switched on, which establishes continuity between the source signal line 160 in the j-th column and the data line 114 in the (4j−2)-th column. In other words, the data signal Sj is supplied to the data line 114 in the (4j−2)-th column. Upon input of an L-level gate signal G2 to the gate signal line 142, the TFT 152 is switched off, which breaks continuity between the source signal line 160 in the j-th column and the data line 114 in the (4j−2)-th column.

For the TFT 153, the gate electrode is connected to the gate signal line 143, the source electrode is connected to the source signal line 160 in the j-th column, and the drain electrode is connected to the data line 114 in the (4j−1)-th column. Upon input of an H-level gate signal G3 to the gate signal line 143, the TFT 153 is switched on, which establishes continuity between the source signal line 160 in the j-th column and the data line 114 in the (4j−1)-th column. In other words, the data signal Sj is supplied to the data line 114 in the (4j−1)-th column. Upon input of an L-level gate signal G3 to the gate signal line 143, the TFT 153 is switched off, which breaks continuity between the source signal line 160 in the j-th column and the data line 114 in the (4j−1)-th column.

For the TFT 154, the gate electrode is connected to the gate signal line 144, the source electrode is connected to the source signal line 160 in the j-th column, and the drain electrode is connected to the data line 114 in the 4j-th column. Upon input of an H-level gate signal G4 to the gate signal line 144, the TFT 154 is switched on, which establishes continuity between the source signal line 160 in the j-th column and the data line 114 in the 4j-th column. In other words, the data signal Sj is supplied to the data line 114 in the 4j-th column. Upon input of an L-level gate signal G4 to the gate signal line 142, the TFT 154 is switched off, which breaks continuity between the source signal line 160 in the j-th column and the data line 114 in the 4j-th column.

The source electrodes of the TFTs 151, 152, 153, and 154 are respectively connected to four branches of the same source signal line 160 and thus receive the same data signal S.

Figure 3:
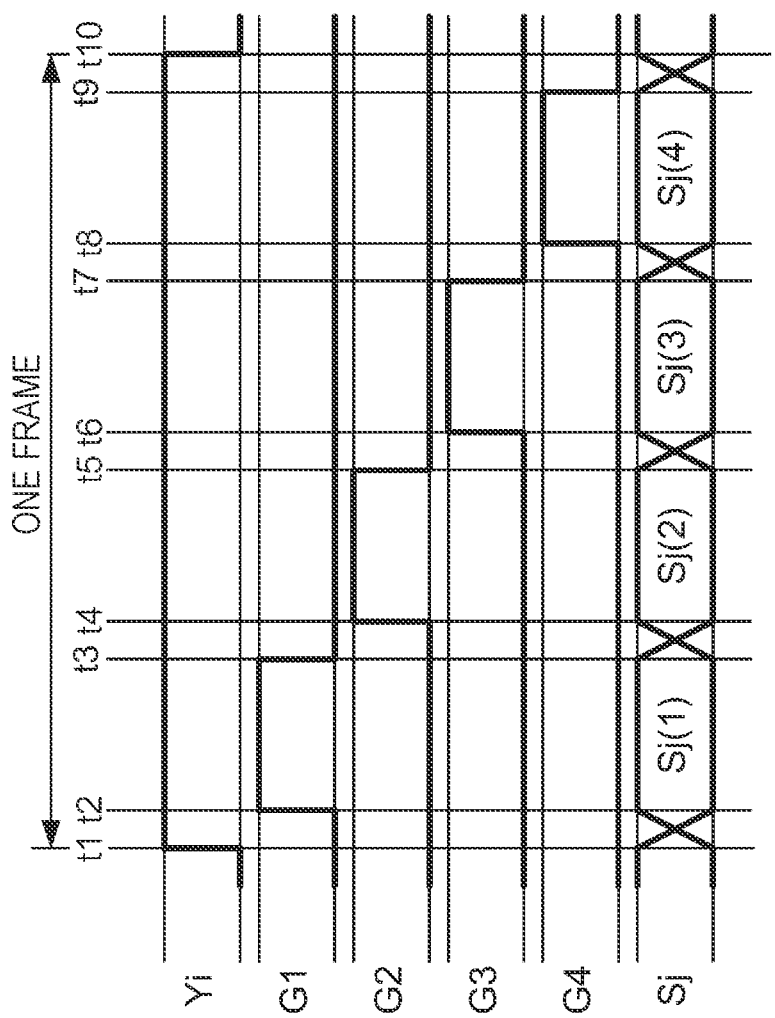
FIG. 3 is a timing chart of the operation of the electrooptic device according to the embodiment.

FIG. 3 is a timing chart of the operation of the electrooptic device 1. Here, data writing to the pixel group in the i-th row and the j-th column will be explained as an example. Just before the time t1, the scan signal Yi and the gate signals G1, G2, G3, and G4 are at the L level. At the time t1, the scan line driving circuit 130 causes a transition of the scan signal Yi from the L level to the H level. Once the scan signal Yi becomes the H level, each pixel TFT 116 conducts, establishing continuity between the data line 114 and the pixel electrode 118.

At the time t2, the data line driving circuit 200 changes the gate signal G1 to the H level. Once the gate signal G1 becomes the H level, the TFT 151 is switched on, establishing continuity between the source signal line 160 in the j-th column and the data line 114 in the (4j−3)-th column. At this time, the data line driving circuit 200 supplies a data signal Sj(1) to the source signal line 160 in the j-th column. Accordingly, data corresponding to the data signal Sj(1) is written to the pixel electrode 118. At the time t3, the data line driving circuit 200 changes the gate signal G1 to the L level. Once the gate signal G1 becomes the L level, the TFT 151 is switched off, breaking continuity between the source signal line 160 in the j-th column and the data line 114 in the (4j−3)-th column.

At the time t4, the data line driving circuit 200 changes the gate signal G2 to the H level. Once the gate signal G2 becomes the H level, the TFT 152 is switched on, establishing continuity between the source signal line 160 in the j-th column and the data line 114 in the (4j−2)-th column. At this time, the data line driving circuit 200 supplies a data signal Sj(2) to the source signal line 160 in the j-th column. Accordingly, data corresponding to the data signal Sj(2) is written to the pixel electrode 118. At the time t5, the data line driving circuit 200 changes the gate signal G2 to the L level. Once the gate signal G2 becomes the L level, the TFT 152 is switched off, breaking continuity between the source signal line 160 in the j-th column and the data line 114 in the (4j−2)-th column.

At the time t6, the data line driving circuit 200 changes the gate signal G3 to the H level. Once the gate signal G3 becomes the H level, the TFT 153 is switched on, establishing continuity between the source signal line 160 in the j-th column and the data line 114 in the (4j−1)-th column. At this time, the data line driving circuit 200 supplies a data signal Sj(3) to the source signal line 160 in the j-th column. Accordingly, data corresponding to the data signal Sj(3) is written to the pixel electrode 118. At the time t7, the data line driving circuit 200 changes the gate signal G3 to the L level. Once the gate signal G3 becomes the L level, the TFT 153 is switched off, breaking continuity between the source signal line 160 in the j-th column and the data line 114 in the (4j−1)-th column.

At the time t8, the data line driving circuit 200 changes the gate signal G4 to the H level. Once the gate signal G4 becomes the H level, the TFT 154 is switched on, establishing continuity between the source signal line 160 in the j-th column and the data line 114 in the 4j-th column. At this time, the data line driving circuit 200 supplies a data signal Sj(4) to the source signal line 160 in the j-th column.

Accordingly, data corresponding to the data signal Sj(4) is written to the pixel electrode 118. At the time t9, the data line driving circuit 200 changes the gate signal G4 to the L level. Once the gate signal G4 becomes the L level, the TFT 154 is switched off, breaking continuity between the source signal line 160 in the j-th column and the data line 114 in the 4j-th column.

At the time t10, the scan line driving circuit 130 causes a transition of the scan signal Yi from the H level to the L level. Once the scan signal Yi becomes the L level, the pixel TFT 116 is switched off, breaking continuity between each of the data lines 114-1, 114-2, 114-3, and 114-4 and the corresponding pixel electrode 118. Through this operation, data writing to the pixel group in the j-th column is terminated. The capacitance of the liquid crystal layer 120 and the holding capacitor 117 hold the charge of the written data until the next data is written. The scan line driving circuit 130 then causes a transition of the scan signal (Yi+1) from the L level to the H level. Accordingly, data is written to the pixel group in the (i+1)-th row. The scan line driving circuit 130 supplies scan signals, which sequentially become the H level in an exclusive manner, to the scan lines 112 in the first row, the second row, the third row, ..., and the m-th row. Once the first to m-th rows all undergo writing, writing for one frame is completed. The scan line driving circuit 130 sequentially supplies scan signals, which sequentially become the H level in an exclusive manner, to the scan lines 112 in the first and following rows once again. Writing for the next image frame is performed in this manner. The data line driving circuit 200 controls the polarities of the data signal S, positive and negative with reference to the common voltage LCcom to alternate for every frame. In other words, the polarity of the voltage applied to the liquid crystal layer 120 switches between the positive and negative for every frame.

The electrooptic device 1 with this structure is characterized by the layout of the data line selecting circuit 150.

Figure 11:
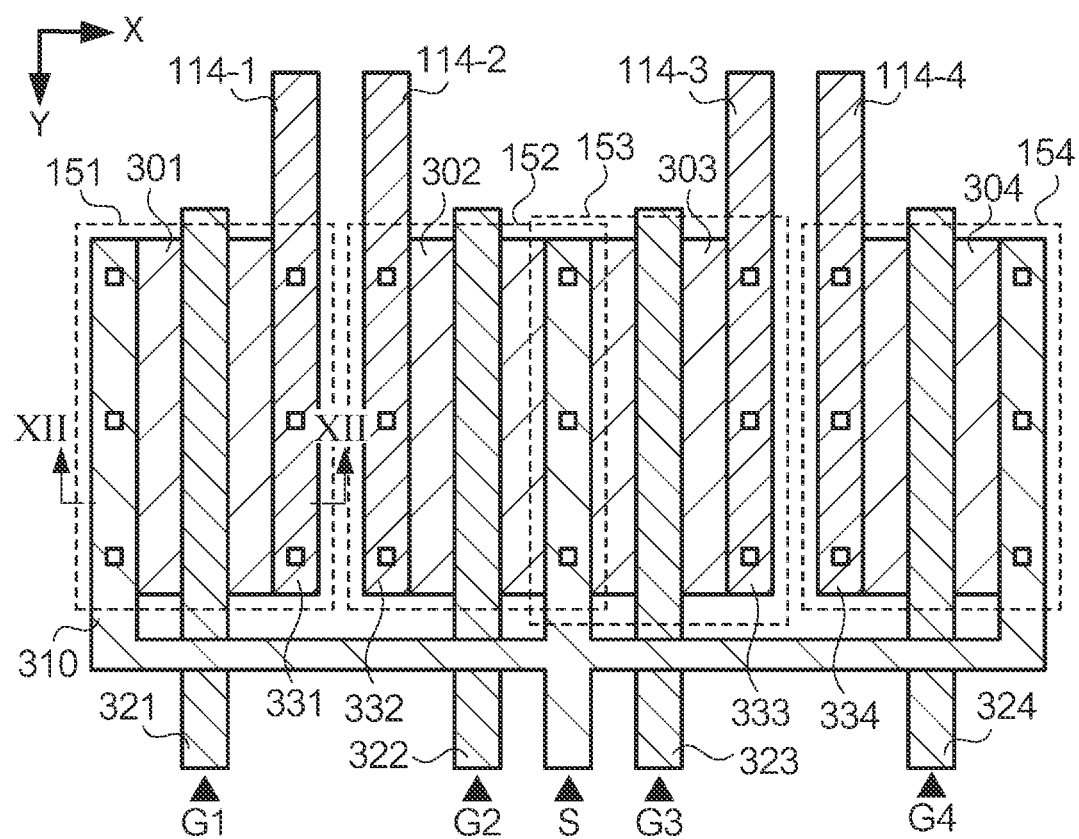
FIG. 11 illustrates a data line selecting circuit for explaining a problem of a related art.
Figure 12:
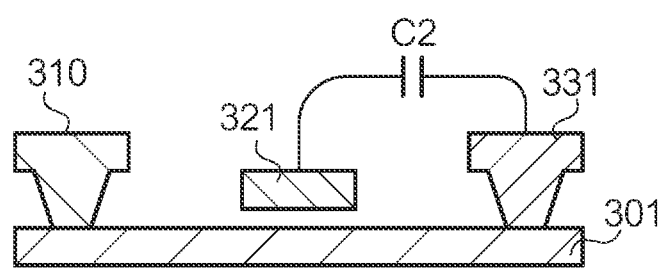
FIG. 12 is a cross-sectional view along line XII-XII in FIG. 11.

FIG. 11 illustrates an existing layout employed in the data line selecting circuit 150 and is used to describe its problems. FIG. 12 is a schematic view along line XII-XII in FIG. 11. In particular, FIG. 12 is a cross-sectional view of the periphery of the data line 114-1 along the X direction (i.e., along the channel length of the TFT).

In this example, the TFT 151 includes a substrate (not shown in the drawing) overlaid by a semiconductor film 301 on which a source electrode 310, a gate electrode 321, and a drain electrode 331 connected to a data line 114-1 are arranged in the X direction. The TFT 152 includes a substrate overlaid by a semiconductor film 302 on which the source electrode 310, a gate electrode 322, and a drain electrode 332 connected to a data line 114-2 are arranged in the X direction. The TFT 153 includes a substrate overlaid by a semiconductor film 303 on which the source electrode 310, a gate electrode 323, and a drain electrode 333 connected to a data line 114-3 are arranged in the X direction. The TFT 154 includes a substrate overlaid by a semiconductor film 304 on which the source electrode 310, a gate electrode 324, and a drain electrode 334 connected to a data line 114-4 are arranged in the X direction. The semiconductor films 301, 302, 303, and 304 are, for example, oxide semiconductor films (e.g. InGaZnO films), although there is no particular limitation on their specific materials.

The signs "☐" in FIG. 11 and FIGS. 4, 6, and 7, mentioned later, represent contact holes which are holes passing through the insulating film from the semiconductor film to the source electrode or the drain electrode. Metal layers reside in the contact holes. The source electrode 310, the gate electrodes 321, 322, 323, and 324, and the drain electrodes 331, 332, 333, and 334 extend in the Y direction.

The gate electrode 321 has coupling capacitance due to gate capacitance (which is not shown in FIG. 11 but occurs between the gate electrode 321 and a semiconductor film 301A) and also has gate-drain capacitance C2 that occurs with respect to the drain electrode 331. Similarly, the gate electrodes 322, 323, and 324 have gate-drain capacitance with respect to the drain electrodes 332, 333, and 334, respectively. The gate-drain capacitance C2 in FIG. 11 includes not only parasitic capacitance with respect to the drain electrode 331 but parasitic capacitance with respect to the drain side of the semiconductor film 301A. In general, push down voltage increases with gate-drain capacitance. This means that reducing gate-drain capacitance is important to restrain an increase in push down voltage.

For this reason, this embodiment employs a data line selecting circuit 150 having the structure described below.

Configuration Example 1

Figure 4:
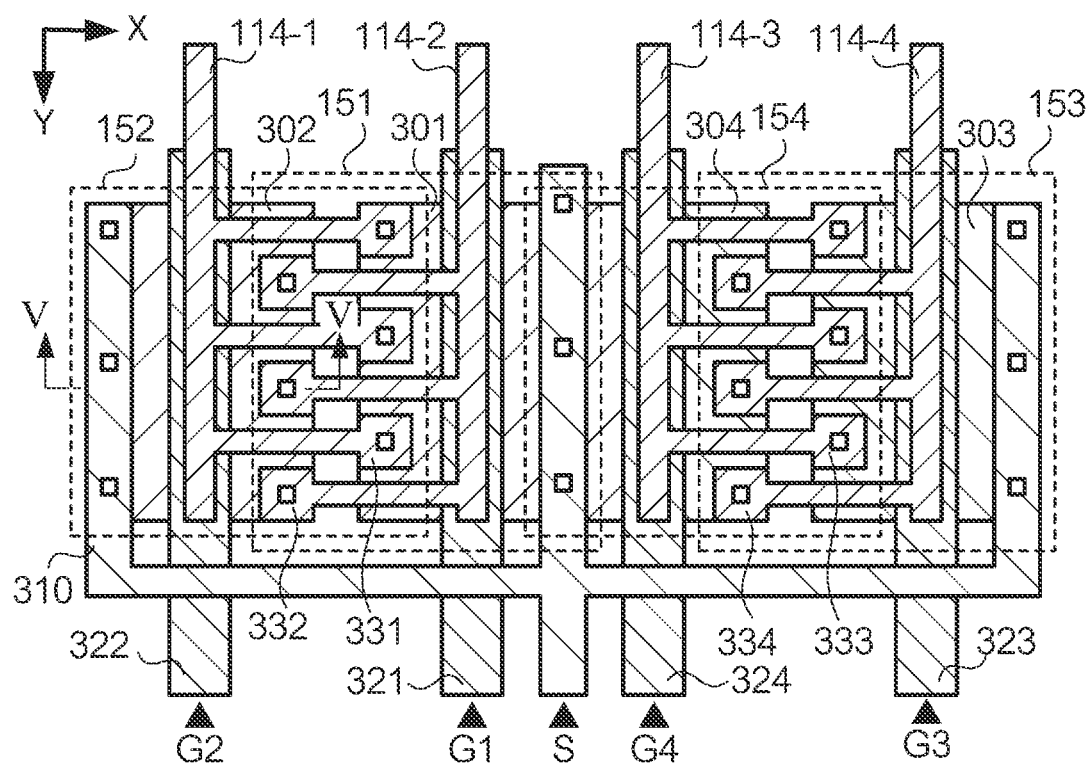
FIG. 4 is a schematic view illustrating an example configuration of the data line selecting circuit according to Configuration example 1 of the embodiment.

FIG. 4 is a schematic view illustrating an example configuration of the data line selecting circuit 150 according to Configuration example 1. The TFTs 151, 152, 153, and 154 each include a semiconductor film, a gate electrode, a source electrode, and a drain electrode, similarly to the related art in FIG. 11.

As shown in FIG. 4, the data lines 114-1, 114-2, 114-3, and 114-4 are respectively connected to the TFTs 151, 152, 153, and 154 and overlap the gate electrodes of TFTs other than the TFTs connected thereto, which is different from the configuration in FIG. 11. To be specific, the data lines 114-1, 114-2, 114-3, and 114-4 are arranged in the X direction in this order, and the gate electrodes 322, 321, 324, and 323 of the TFTs 152, 151, 153, and 154 are arranged in the X direction in this order. The data line 114-1 connected to the TFT 151 overlaps the gate electrode 322 of the TFT 152 and its central line extending in the Y direction overlaps the central line of the gate electrode 322 extending in the Y direction. With this configuration, the data line 114-1 is connected to the drain electrode 331 positioned away therefrom in the X direction. The data line 114-2 connected to the TFT 152 overlaps the gate electrode 321 of the TFT 151 and its central line extending in the Y direction overlaps the central line of the gate electrode 321 extending in the Y direction. The data line 114-2 is connected to the drain electrode 332 positioned away therefrom in the direction opposite to the X direction. The data line 114-3 connected to the TFT 153 overlaps the gate electrode 324 of the TFT 154 and its central line extending in the Y direction overlaps the central line of the gate electrode 324 extending in the XY direction. The data line 114-3 is connected to the drain electrode 333 positioned away therefrom in the X direction. The data line 114-4 connected to the TFT 154 overlaps the gate electrode 323 of the TFT 153 and its central line extending in the Y direction overlaps the central line of the gate electrode 323 extending in the Y direction. The data line 114-4 is connected to the drain electrode 334 positioned away therefrom in the direction opposite to the X direction.

The data lines 114-1, 114-2, 114-3, and 114-4 are narrower than the gate electrodes 322, 321, 324, and 323. Consequently, the data lines 114-1, 114-2, 114-3, and 114-4 partly cover the gate electrodes 322, 321, 324, and 323, respectively from above. Moreover, in the data line selecting circuit 150, the drain electrode of one TFT and the drain electrode of another TFT alternate in the Y direction.

The TFT 151 is one example of the first transistor of the invention, and the TFT 152 is one example of the second transistor of the invention. The TFT 153 is one example of the first transistor of the invention, and the TFT 154 is one example of the second transistor of the invention. The data line 114-1 is one example of the first data line of the invention, and the data line 114-2 is one example of the second data line of the invention. The data line 114-3 is one example of the first data line of the invention, and the data line 114-4 is one example of the second data line of the invention.

Figure 5:
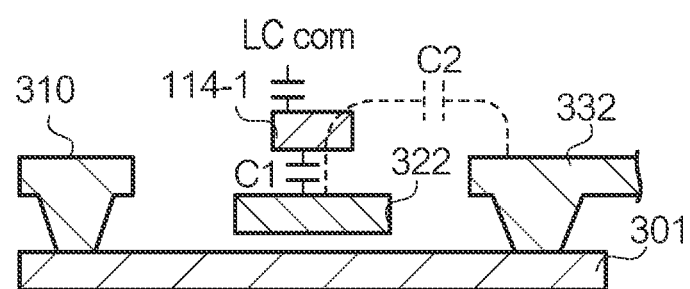
FIG. 5 is a cross-sectional view along line V-V in FIG. 4.

FIG. 5 is a schematic view along line V-V in FIG. 4. In particular, FIG. 5 is a cross-sectional view of the periphery of the TFT 152 along the X direction.

As shown in FIG. 5, the gate electrode 322 of the TFT 152 has coupling capacitance C1 with respect to the data line 114-1 connected to the TFT 151. Hence, the presence of the data line 114-1 precludes the capacitance coupling between the gate electrode 322 and the drain electrode 332, resulting in low parasitic capacitance and thus low gate-drain capacitance C2. This reduces push down voltage. Similarly, although not shown in the drawing, the presence of the data line 114-2 connected to the TFT 152 precludes the capacitance coupling between the gate electrode 321 and the drain electrode 331 of the TFT 151, resulting in low gate-drain capacitance. Similarly, the presence of the data line 114-3 connected to the TFT 153 precludes the capacitance coupling between the gate electrode 324 and the drain electrode 334 of the TFT 154, resulting in low gate-drain capacitance. Similarly, the presence of the data line 114-4 connected to the TFT 154 precludes the capacitance coupling between the gate electrode 323 and the drain electrode 333 of the TFT 153, resulting in low gate-drain capacitance. This reduces push down voltage due to gate-drain capacitance.

Configuration Example 2

Figure 6:
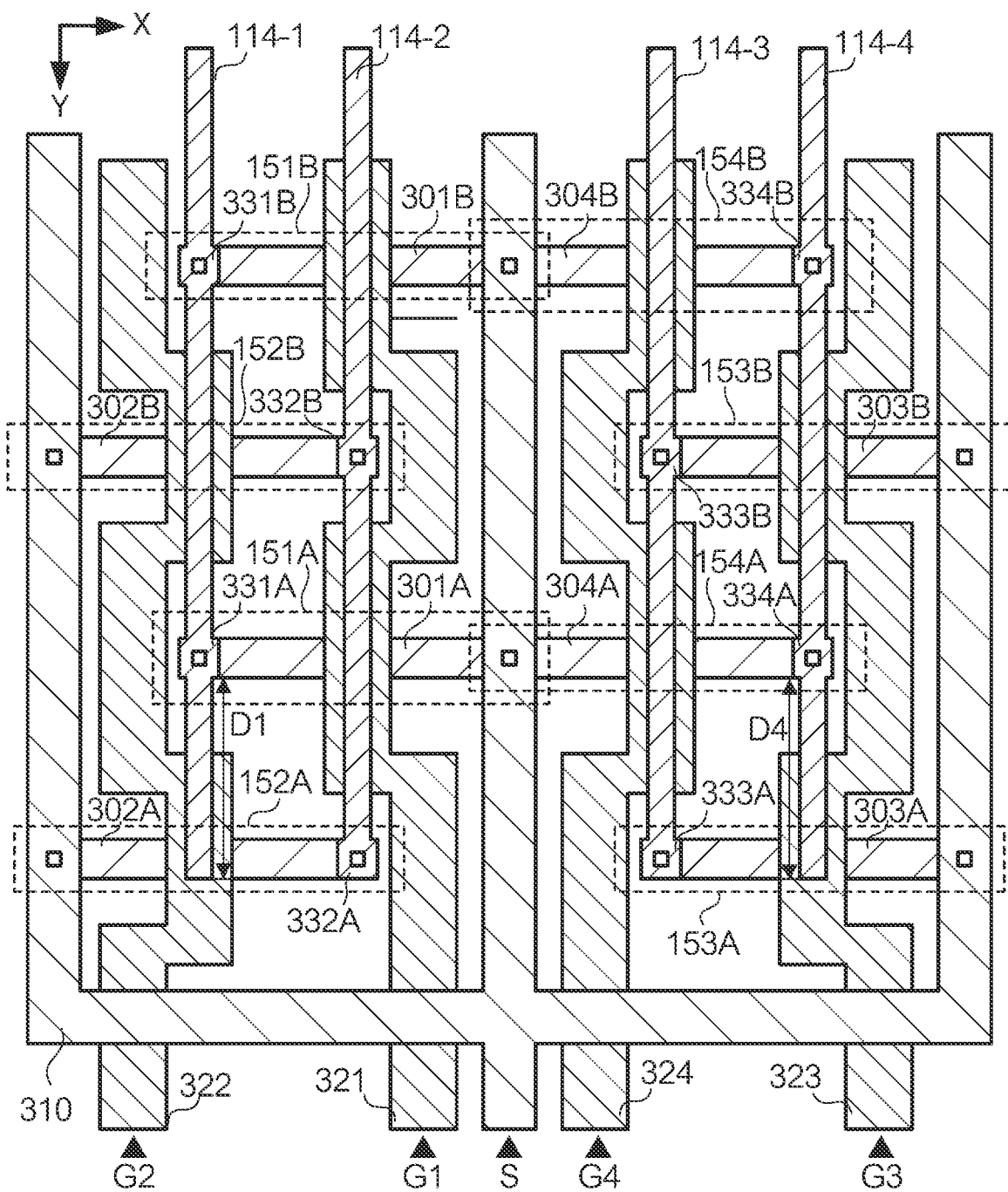
FIG. 6 is a schematic view illustrating an example configuration of the data line selecting circuit according to Configuration example 2 of the embodiment.

FIG. 6 is a schematic view illustrating an example configuration of the data line selecting circuit 150 according to Configuration example 2. Configuration example 2 differs from Configuration example 1 in that the TFTs 151, 152, 153, and 154 each consist of a plurality of sub-transistors. In particular, the TFT 151 consists of a sub-transistor 151A and a sub-transistor 151B. In terms of a circuit configuration, the sub-transistor 151A and the sub-transistor 151B are connected in parallel. The lengths of the sub-transistor 151A and the sub-transistor 151B in the Y direction are illustrated shorter than actual ones for convenience of description. A plurality of sub-transistors making up one TFT are arranged in the Y direction and share the same drain electrode and source electrode. The TFT 152 consists of a sub-transistor 152A and a sub-transistor 152B. The TFT 153 consists of a sub-transistor 153A and a sub-transistor 153B. The TFT 154 consists of a sub-transistor 154A and a sub-transistor 154B. In FIG. 6, the semiconductor films and the drain electrodes of the sub-transistors included in the same TFT are denoted by the same reference numerals as the semiconductor film and drain electrode of the corresponding TFT in FIG. 4 as well as the alphabetical characters next to the reference numerals of the sub-transistors. For example, the semiconductor film of the sub-transistor 151A in the TFT 151 is a "semiconductor film 301A". The drain electrode of the sub-transistor 152B in the TFT 152 is a "drain electrode 332B".

As shown in FIG. 6, the data line 114-1 overlaps the gate electrode 322 of the sub-transistor 152A and the sub-transistor 152B. The data line 114-2 overlaps the gate electrode 321 of the sub-transistor 151A and the sub-transistor 151B. The data line 114-3 overlaps the gate electrode 324 of the sub-transistor 154A and the sub-transistor 154B. The data line 114-4 overlaps the gate electrode 323 of the sub-transistor 153A and the sub-transistor 153B. With this configuration, as in Configuration example 1, the presence of the data lines 114-1, 114-2, 114-3, and 114-4 reduces push down voltage due to gate-drain capacitance.

The sub-transistors 151A and 151B are one example of the first sub-transistor of the invention, and the sub-transistors 152A and 152B are one example of the second sub-transistor of the invention. The sub-transistors 153A and 153B are one example of the first sub-transistor of the invention, and the sub-transistors 154A and 154B are one example of the second sub-transistor of the invention.

In Configuration example 2, the TFTs 151, 152, 153, and 154 each consist of a plurality of sub-transistors, and an overlap between the gate electrode 322 and the data line 114-1 and an overlap between the gate electrode 321 and the data line 114-2 alternate in the Y direction. Similarly, an overlap between the gate electrode 324 and the data line 114-3 and an overlap between the gate electrode 323 and the data line 114-4 alternate in the Y direction. Thus, the narrow pitch layout of the data line 114 and the TFTs 151, 152, 153, and 154 can be achieved. Although this increases the circuit length in the Y direction, an overlap between the gate electrode 322 and the data line 114 restrains gate-drain capacitance. The "common centroid layout" used here can make the electric characteristics of the adjacent TFTs 151 and 152 or the adjacent TFTs 153 and 154 uniform, leading to uniform display. Therefore, use of a narrow pitch layout in the electrooptic device 1 does not impair the display quality and reduces push down voltage.

The data line 114-1 includes a wiring portion D1 extending from the drain electrode 331A connected to, among the sub-transistors in the TFT 151, the sub-transistor 151A, which is farthest from the pixel area 110 (pixel 111), in a direction away from the pixel 111 (here, Y direction). The data line 114-4 includes a wiring portion D4 extending from the drain electrode 334A connected to the sub-transistor 154A, which is the sub-transistors in the TFT 154 farthest from the pixel 111, in a direction away from the pixel 111 (Y direction). The wiring portions D1 and D4, which are unnecessary for making electrical connections, are used to restrain unevenness of parasitic capacitance between the drain electrodes 331, 332, 333, and 334. Restraining unevenness of parasitic capacitance reduces unevenness of push down voltage and display.

Configuration Example 3

Figure 7:
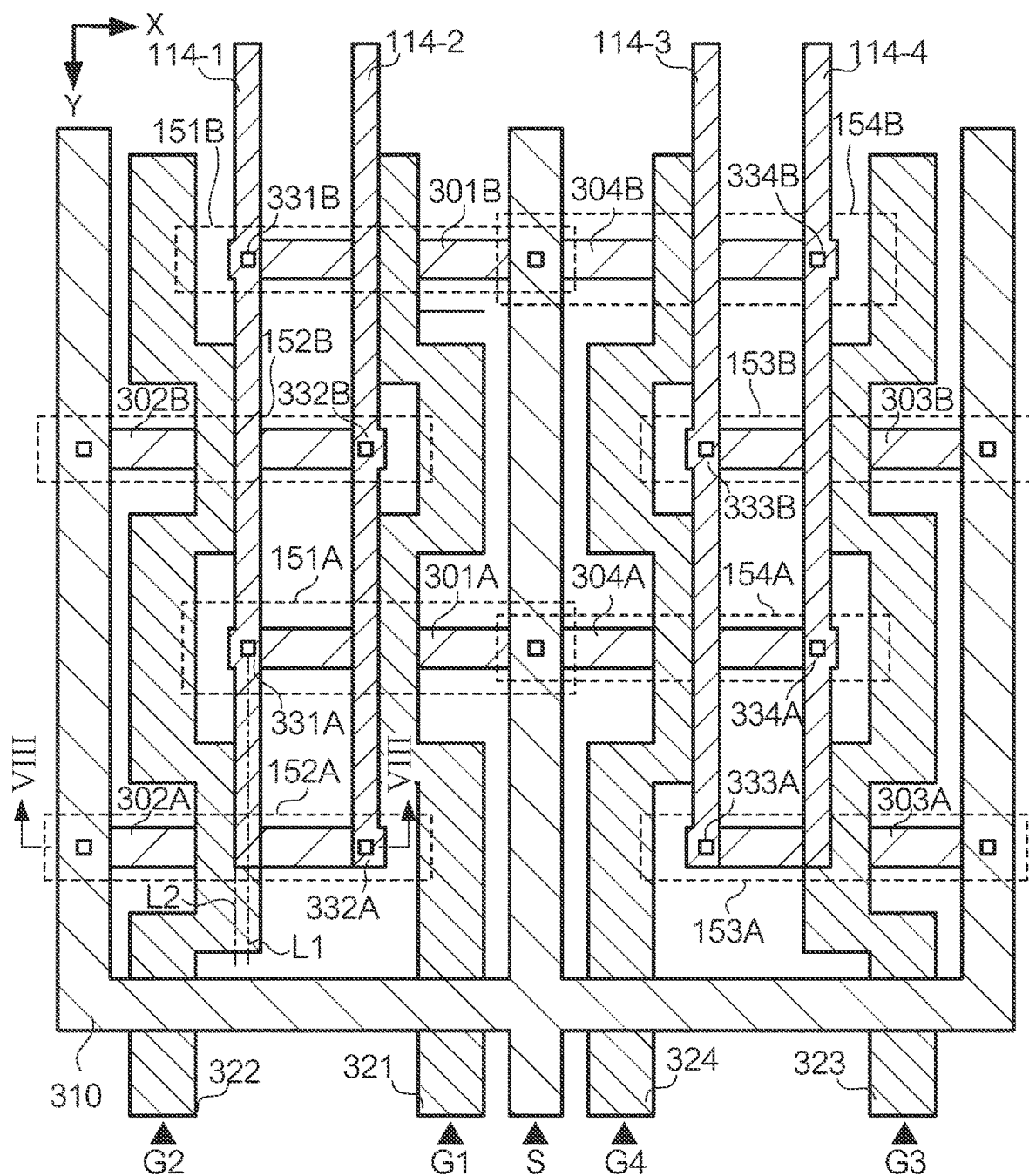
FIG. 7 is a schematic view illustrating an example configuration of the data line selecting circuit according to Configuration example 3 of the embodiment.
Figure 8:
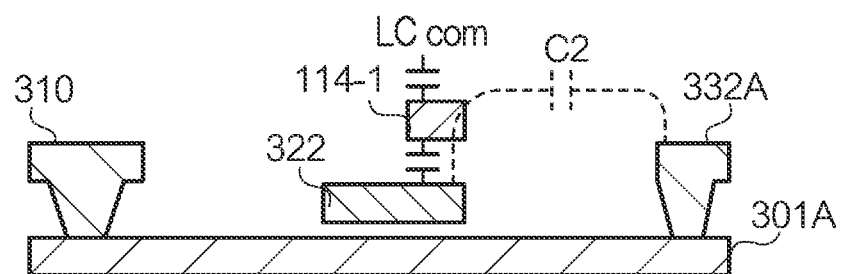
FIG. 8 is a cross-sectional view along line VIII-VIII in FIG. 7.

FIG. 7 is a schematic view illustrating an example configuration of the data line selecting circuit 150 according to Configuration example 3. FIG. 8 is a schematic view along line VIII-VIII in FIG. 7. In particular, FIG. 8 is a cross-sectional view of the periphery of the sub-transistor 152A along the X direction.

The data line selecting circuit 150 according to Configuration example 3 differs from that according to Configuration example 2 in that the central lines L1 of the data lines 114-1, 114-2, 114-3, and 114-4 extending in the Y direction deviate (are offset) in the X direction from the respective central lines L2, which pass the middle of the length in the X direction (i.e., channel length direction), of the gate electrodes 322, 321, 324, and 323. For example, the central line L1 of the data line 114-1 deviates from the central line L2 of the gate electrode 322 toward the drain electrode 332A (and the drain electrode 332B), i.e., the data line 114-2. Similarly, the central line of the data line 114-2 deviates from the central line of the gate electrode 321 of the sub-transistors 151A and 151B toward the drain electrodes 331A and 331B (i.e., the data line 114-1). The central line of the data line 114-3 deviates from the central line of the gate electrode 324 of the sub-transistors 154A and 154B toward the drain electrodes 334A and 334B (i.e., the data line 114-4). The central line of the data line 114-4 deviates from the central line of the gate electrode 323 toward the drain electrodes 333A and 333B of the TFT 153 (i.e., the data line 114-3).

A structure in which the data lines 114-1, 114-2, 114-3, and 114-4 completely cover the gate electrodes 322, 321, 324, and 323, respectively from above leads to a reduction in gate-drain capacitance, which is a preferred effect. This structure, however, increases parasitic capacitance due to the data lines, which is an undesirable effect resulting in a heavy drive load on the data line driving circuit 200. Similarly, the drive load on the gate electrodes 321, 322, 323, and 324 increases, which is an undesirable effect resulting in a heavy drive load on the data line driving circuit 200. The inventors have found that gate-drain capacitance can be efficiently reduced by positional relationships in a layout where the data lines 114-1, 114-2, 114-3, and 114-4 overlap the gate electrodes 322, 321, 324, and 323, respectively, which restrains gate-drain capacitance with a limited range of width of the data lines 114-1, 114-2, 114-3, and 114-4. The inventors have actually confirmed a reduction in gate-drain capacitance in the following manner.

FIGS. 9A to 9D show the calculations of parasitic capacitance in Configuration examples 1, 2, and 3. The parasitic capacitance was calculated with a highly-accurate capacitance extraction tool produced by JEDAT Inc.

The conditions of TFTs were as follows. The drawings on the left in FIGS. 9A to 9C each show the layout of the electrodes of the TFT. "S" represents source electrode, "G", gate electrode, "D", drain electrode, and "M", data line (drain wire) connected to another TFT.

(1) TFT channel size W: 50 μm
(2) Vertical structure
Substrate thickness: 10 μm (relative permittivity 3.5)
Semiconductor film thickness: 0.05 μm
Gate insulating film thickness: 0.085 μm (relative permittivity 3.9)
Gate electrode film thickness: 0.2 μm
Interlayer insulating film thickness: 0.3 μm
Metal wire film thickness: 0.5 μm
Set capacity maximum extraction width: 5 μm FIG. 9A shows a layout related to a related art, in which the source-gate distance and the gate-drain distance are 1.5 μm and the gate electrode and the data line do not overlap. FIG. 9B shows a layout related to Configuration examples 1 and 2, in which the source-gate distance and the gate-drain distance are 1.5 μm like in FIG. 9A and the gate electrode overlaps a 2-μm-wide data line. FIG. 9C shows a calculated layout related to Configuration example 3, in which the source-gate distance and the gate-drain distance are 1.5 μm like in FIG. 9B and the data line is 1 μm closer to the drain electrode than in FIG. 9B.

FIG. 9D shows the calculations of parasitic capacitance based on the gate electrode. "ALL" refers to the parasitic capacitance of the overall gate electrode, "S", gate-source capacitance, "D", gate-drain capacitance, and "M", gate-data line capacitance. Since the value of each component is rounded off, the sum of these measurement values is not necessarily equal to the value of "ALL". The table does not take the capacitance of the gate insulating film into consideration.

In the case shown in FIG. 9A, the gate-drain capacitance was 7.1 fF. In the case shown in FIG. 9B, the gate-drain capacitance was 6.7 fF. It was therefore confirmed that the gate-drain capacitance is low in a layout in which a gate electrode overlaps a data line like in Configuration examples 1 and 2. In the case shown in FIG. 9C, the gate-drain capacitance was 5.8 fF. It was therefore confirmed that deviating one central line from another like in Configuration example 3 further reduces gate-drain capacitance. It should be noted that this configuration in which one central line is deviated from another may be applied to TFTs which do not include sub-transistors like those in Configuration example 1.

The invention can also be implemented in any embodiment different from the above embodiment. Modifications below may be implemented in combination.

In Configuration examples 2 and 3, the data lines linearly extend and the gate electrodes meander. Alternatively, the data lines may meander and the gate electrodes may extend linearly. Alternatively, the data lines and the gate electrodes may both meander. A layout that efficiently prevents the capacitance coupling between the gate electrodes and the data lines reduces push down voltage due to the parasitic capacitance in the transistors.

The layout of the data line selecting circuit 150 described in the above embodiment is merely illustrative. Instead of the configuration in which one source signal line 160 is connected to four (k=4) TFTs, a configuration in which one source signal line 160 is connected to three or less or five or more TFTs may be employed. Moreover, in Configuration examples 2 and 3, each TFT may consist of three or more sub-transistors.

The electrooptic device of the invention is not limited to an electrooptic device with a hybrid drive system. The electrooptic device of the invention may be, for example, an electrooptic device with a phase development drive system. In the phase development drive system here, A signal lines are arranged in a pixel area in accordance with the number A of pixels arranged in the horizontal direction (X direction), B (B<A) signal lines are arranged on a liquid crystal panel, and external video signals, which are divided into N phases, are supplied. Meanwhile, groups of B switching circuits are disposed between the B signal lines and the A signal lines in the pixel area. The B switching circuits in the same group are concurrently operated by the same switching control signal. Video signals divided into B phases are concurrently written to the pixels in the selected row, B pixels by B pixels.

The liquid crystal in the above embodiment may be, instead of being reflective, translucent or both translucent and reflective, i.e., semitransparent and semireflective.

The liquid crystal panel 100 is not limited to using TN liquid crystal and may be encapsulated with vertical alignment (VA) liquid crystal.

Color display may be performed by dots each consisting of three pixels of red (R), green (G), and blue (B) or pixels of four or more colors, i.e., the above three and other additional colors.

The invention is not limited to a liquid crystal electrooptic device and may be an electrooptic device using organic electroluminescence (EL) or other technologies instead.

Figure 10:
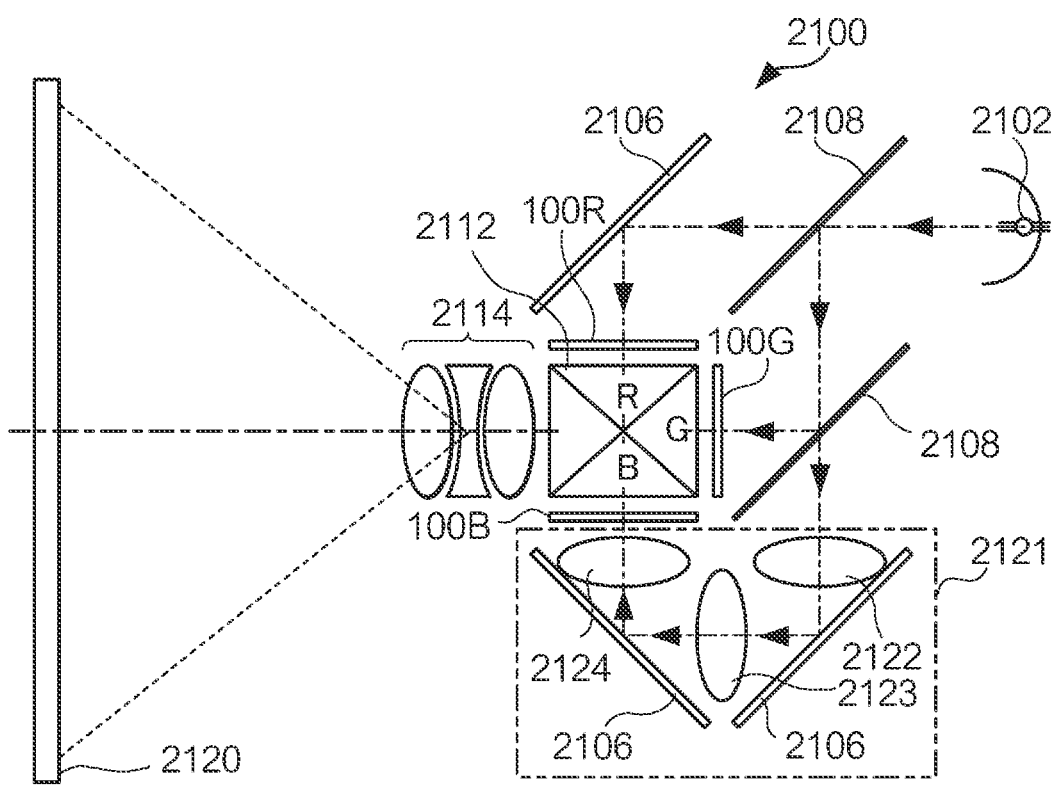
FIG. 10 illustrates a projector including the electrooptic device according to the embodiment.

An electronic apparatus including the electrooptic device according to the above embodiment as a display device will be described. FIG. 10 illustrates the configuration of a projector 2100 including the electrooptic device according to the embodiment.

In the projector 2100, the electrooptic device including three liquid crystal panels 100 for R, G, and B, respectively. The light bulbs 100R, 100G, and 100B have the same configuration as the above-described liquid crystal panel 100. Video signals, defining the grayscale levels of the primary colors of R, G, and B, are supplied from the respective higher-level external circuits, thereby operating the light bulbs 100R, 100G, and 100B, respectively.

Light modulated by the light bulbs 100R, 100G, and 100B enter a dichroic prism 2112 from three directions. R and B light are redirected at 90° in the dichroic prism 2112, while G light travels therethrough in straight lines. Consequently, after composition of the images of the primary colors, a color image is projected on a screen 2120 through a projecting lens 2114.

It should be noted that the light bulbs 100R, 100G, and 100B do not require color filters because they receive R, G, and B light, respectively from a dichroic mirror 2108. Since images passing through the light bulbs 100R and 100B are reflected off the dichroic prism 2112 and then projected, whereas images passing through the image light bulb 100G are projected as they are, the direction of horizontal scanning by the light bulbs 100R and 100B is opposite to the direction of horizontal scanning by the light bulb 100G so that mirror-reversed images can be displayed.

Examples of electronic apparatuses to which the electrooptic device is applicable include, in addition to the projector in FIG. 10, digital still cameras, laptop computers, liquid crystal TV sets, optical viewfinder type (or direct-view monitor type) video recorders, car navigation systems, pagers, electronic notebooks, calculators, word processors, workstations, video phones, POS terminals, and machines with a touch screen. Not surprisingly, the above-described electrooptic devices are applicable to the display devices in these electronic apparatuses.

This application claims priority from Japanese Patent Application No. 2015-256089 filed in the Japanese Patent Office on Dec. 28, 2015, the entire disclosure of which is hereby incorporated by reference in its entirely.

What is claimed is:

1. An electrooptic device comprising:
    a scan line;
    a first data line and a second data line that intersect the scan line;
    a scan line driving circuit that selects the scan line;
    a data line driving circuit that supplies data signals to the first data line or the second data line in a period when the scan line is selected;
    a first transistor that includes a first drain electrode connected to the first data line, a first source electrode connected to the data line driving circuit, a first semiconductor film disposed between the first drain electrode and the first source electrode, and a first gate electrode receiving gate signals for selecting the first data line; and
    a second transistor that includes a second drain electrode connected to the second data line, a second source electrode connected to the data line driving circuit, a second semiconductor film disposed between the second drain electrode and the second source electrode, and a second gate electrode receiving gate signals for selecting the second data line,
    wherein the first gate electrode has a portion that, in plan view, overlaps the first semiconductor film and the second data line at a same location, and
    wherein the second gate electrode has a portion that, in plan view, overlaps the second semiconductor film and the first data line at a same location.

2. The electrooptic device according to claim 1, wherein the first drain electrode is disposed between the second drain electrode and the first gate electrode in plan view,
    the second drain electrode is disposed between the first drain electrode and the second gate electrode in plan view,
    the first data line includes a first connecting portion overlapping the second drain electrode in plan view, and
    the second data line includes a second connecting portion overlapping the first drain electrode in plan view.

3. The electrooptic device according to claim 2, wherein
    the first data line includes a third connecting portion overlapping the second drain electrode in plan view, and
    the second connecting portion is disposed between the first connecting portion and the third connecting portion in plan view.

4. The electrooptic device according to claim 3, wherein the first data line is narrower than the second gate electrode, and the second data line is narrower than the first gate electrode.

5. The electrooptic device according to claim 3, wherein
    a central line of the first data line overlaps a central line of the second gate electrode in plan view, and
    a central line of the second data line overlaps a central line of the first gate electrode in plan view.

6. An electronic apparatus comprising the electrooptic device according to claim 3.

7. The electrooptic device according to claim 2, wherein the first data line is narrower than the second gate electrode, and the second data line is narrower than the first gate electrode.

8. The electrooptic device according to claim 2, wherein
    a central line of the first data line overlaps a central line of the second gate electrode in plan view, and
    a central line of the second data line overlaps a central line of the first gate electrode in plan view.

9. An electronic apparatus comprising the electrooptic device according to claim 2.

10. The electrooptic device according to claim 1, wherein the first data line is narrower than the second gate electrode, and the second data line is narrower than the first gate electrode.

11. The electrooptic device according to claim 10, wherein
    a central line of the first data line overlaps a central line of the second gate electrode in plan view, and
    a central line of the second data line overlaps a central line of the first gate electrode in plan view.

12. An electronic apparatus comprising the electrooptic device according to claim 10.

13. The electrooptic device according to claim 1, wherein
    a central line of the first data line overlaps a central line of the second gate electrode in plan view, and
    a central line of the second data line overlaps a central line of the first gate electrode in plan view.

14. An electronic apparatus comprising the electrooptic device according to claim 13.

15. An electronic apparatus comprising the electrooptic device according to claim 1.

* * * * *